United States Patent
Karagiannis et al.

(10) Patent No.: US 9,242,401 B2
(45) Date of Patent: Jan. 26, 2016

(54) INJECTION MOLDED MULTIPLE LAYER GLAZINGS

(75) Inventors: Aristotelis Karagiannis, Amherst, MA (US); Francois Andre Koran, Longmeadow, MA (US); Ping Yuan, Amherst, MA (US)

(73) Assignee: Solutia Inc., St. Louis, MO (US)

( * ) Notice: Subject to any disclaimer, the term of this patent is extended or adjusted under 35 U.S.C. 154(b) by 839 days.

(21) Appl. No.: 11/466,765

(22) Filed: Aug. 23, 2006

(65) Prior Publication Data

US 2008/0047655 A1 Feb. 28, 2008

(51) Int. Cl.
| | |
|---|---|
| *B29C 45/14* | (2006.01) |
| *B29C 45/00* | (2006.01) |
| *B32B 17/10* | (2006.01) |
| B29K 31/00 | (2006.01) |
| B29K 75/00 | (2006.01) |
| B29K 709/08 | (2006.01) |
| B29L 31/00 | (2006.01) |

(52) U.S. Cl.
CPC ....... *B29C 45/14467* (2013.01); *B29C 45/0001* (2013.01); *B29C 45/14778* (2013.01); *B32B 17/10036* (2013.01); *B32B 17/1077* (2013.01); *B32B 17/10743* (2013.01); *B32B 17/10761* (2013.01); *B32B 17/10788* (2013.01); *B32B 17/10917* (2013.01); B29K 2031/04 (2013.01); B29K 2075/00 (2013.01); B29K 2709/08 (2013.01); B29K 2995/0088 (2013.01); B29L 2031/7782 (2013.01)

(58) Field of Classification Search
CPC ..................... B32B 17/10036; B32B 17/1055; B32B 17/10807; B32B 17/10908; E06B 3/6775; C03C 27/06; C03C 27/10
USPC ............. 156/104, 109, 99, 102, 103; 264/261
See application file for complete search history.

(56) References Cited

U.S. PATENT DOCUMENTS

| | | |
|---|---|---|
| 264,510 A | 9/1882 | Bolton |
| 1,937,396 A | 11/1933 | Watkins |
| 2,282,026 A | 5/1942 | Bren et al. |

(Continued)

FOREIGN PATENT DOCUMENTS

| | | |
|---|---|---|
| CA | 981172 | 1/1976 |
| DE | 27 28 762 | 1/1979 |

(Continued)

OTHER PUBLICATIONS

International Search Report, International Patent Application No. PCT/US2007/076462, mailed Jul. 12, 2007, 3 pages.

(Continued)

*Primary Examiner* — Christopher Schatz
(74) *Attorney, Agent, or Firm* — Steven A. Owen

(57) ABSTRACT

The present invention is directed to the use of injection molding to form polymeric interlayers directly between two rigid substrates that are positioned so that after injection of the melted polymeric material and after cooling, the resulting multiple layer panel functions as a safety panel that can be used in any appropriate conventional safety glazing application. Methods of the present invention utilize a relatively low molecular weight polymer, multiple injection points, mold compression, and/or a heated substrate in order to facilitate the injection of polymer into the relatively narrow space between glazing substrates that is typically found in safety glazings.

9 Claims, 8 Drawing Sheets

(56) References Cited

U.S. PATENT DOCUMENTS

| | | | |
|---|---|---|---|
| 2,282,057 A | | 5/1942 | Hopkins et al. |
| 3,841,890 A | | 10/1974 | Coaker et al. |
| 4,017,661 A | | 4/1977 | Gillery |
| 4,144,217 A | | 3/1979 | Snelgrove et al. |
| 4,299,639 A | | 11/1981 | Bayer |
| 4,584,229 A | * | 4/1986 | Bourelier et al. ............. 428/216 |
| 4,614,781 A | | 9/1986 | Hori et al. |
| 4,786,783 A | | 11/1988 | Woodard |
| 4,799,745 A | | 1/1989 | Meyer et al. |
| 4,806,191 A | * | 2/1989 | Jechel et al. .................. 156/382 |
| 4,935,470 A | | 6/1990 | Tanuma et al. |
| 5,013,779 A | | 5/1991 | Fariss et al. |
| 5,137,954 A | | 8/1992 | DasGupta et al. |
| 5,352,530 A | | 10/1994 | Tanuma et al. |
| 5,415,909 A | | 5/1995 | Shohi et al. |
| 5,728,472 A | | 3/1998 | D'Errico |
| 5,980,666 A | * | 11/1999 | Roth et al. .................... 156/107 |
| 6,265,054 B1 | | 7/2001 | Bravet et al. |
| 6,296,799 B1 | | 10/2001 | Sato |
| 6,368,537 B1 | | 4/2002 | Sato |
| 6,669,890 B1 | | 12/2003 | Sato |
| 6,797,396 B1 | | 9/2004 | Liu et al. |
| 2003/0161997 A1 | * | 8/2003 | Moran .......................... 428/172 |
| 2008/0047655 A1 | | 2/2008 | Karagiannis et al. |

FOREIGN PATENT DOCUMENTS

| | | |
|---|---|---|
| EP | 0157030 A1 | 9/1985 |
| EP | 0 211 818 | 2/1987 |
| EP | 0 490 580 | 6/1992 |
| EP | 0 908 287 A1 | 4/1999 |
| EP | 0908 287 | 4/1999 |
| FR | 2 750 075 | 12/1997 |
| GB | 1 401 986 | 8/1975 |
| GB | 1 444 730 | 8/1976 |
| JP | H04275113 A | 9/1992 |
| JP | 11138668 A | 5/1999 |
| WO | 8801230 A1 | 2/1988 |

OTHER PUBLICATIONS

Written Opinion, International Preliminary Report on Patentability, International Patent Application No. PCT/US2007/076462, issued on Feb. 24, 2009, 13 pages.

* cited by examiner

INJECTION MOLDED MULTIPLE LAYER GLAZINGS

FIELD OF THE INVENTION

The present invention is in the field of multiple layer glazings, and, specifically, the present invention is in the field of safety glazings that have conventionally used autoclave lamination to combine polymeric sheets and rigid layers such as glass into a laminated safety glazing.

BACKGROUND

Safety glass is used in many glass applications for which improved impact resistance and glass retention is desirable. A prominent example of safety glass use is as a windshield for motor vehicle applications.

Safety glass is available in many configurations. Commonly, safety glass is composed of a polymeric interlayer disposed between two layers of glass. The polymeric interlayer can be, for example, a single sheet or multiple sheets. The polymeric material is typically a plasticized poly(vinyl butyral) that functions in an accident to both absorb energy and retain fragmented glass.

Safety glass is typically made by initially assembling a sheet of polymeric interlayer between two panes of glass. The assembly is then fed to a de-air oven where heat and force are applied to tack, or partially bond, the interlayer to the glass. The prelaminate thus formed is then placed in an autoclave, where temperature and pressure are applied in order to finish the bonding process and create an optically clear, impact resistant safety glazing.

While well known and straightforward, this conventional lamination technique is replete with procedural difficulties that are labor intensive, time consuming, and pose safety concerns. For example, during the initial assembly of the components, the interlayer sheet is typically larger than the bounding glass and is usually trimmed flush with the edges of the glass. This operation typically requires manual labor, often limits throughput, and poses a safety concern.

Further, the conventional lamination process is energy intensive and time-consuming, both of which increase the cost and production time for laminated glass. For example, the three main steps—assembly, de-air, and autoclave—each require significant amounts of time, resulting in a total fabrication process that can easily add up to 8 hours from start to finish. Furthermore, much of the energy supplied to one process, such as the thermal energy supplied to the de-air process, is typically not carried over to the following autoclave step, which requires additional thermal energy.

One proposed solution to the limitations inherent in conventional lamination techniques is disclosed in European Patent Application 0908287 (Komatsu)(see also U.S. Pat. Nos. 6,296,799, 6,669,890, and 6,368,537) which discloses the injection of resin into a glass insert, followed by compression of the mold cavity.

What are needed in the art are methods of producing glass panels, and other glazing panels, that do not require extensive fabrication procedures and that allow for the rapid and inexpensive formation of multiple layer glazings.

SUMMARY OF THE INVENTION

The present invention is directed to the use of injection molding to form polymeric interlayers directly between two rigid substrates that are positioned so that after injection of the melted polymeric material and after cooling, the resulting multiple layer panel functions as a safety panel that can be used in any appropriate conventional safety glazing application. Methods of the present invention utilize a relatively low molecular weight polymer, multiple injection points, mold compression, and/or a heated substrate in order to facilitate the injection of polymer into the relatively narrow space between glazing substrates that is typically found in safety glazings.

DETAILED DESCRIPTION

Figure 1:
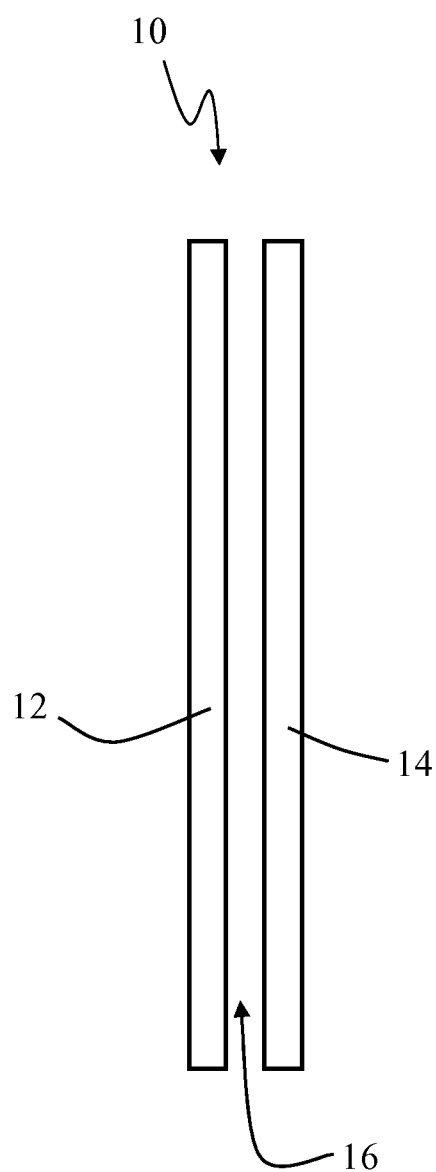
FIG. 1 represents a schematic, cross-sectional view of two layers of glass prior to injection molding.

The present invention is directed to methods of making multiple layer glazings using injection molding. While the invention will, for convenience, be described as a multiple layer construct having two panes of glass between which a polymer melt is injected, it will be understood, and described in detail below, that in various embodiments other rigid substrates can be used in place of glass.

Multiple layer glass panels of the present invention are formed using injection molding techniques that use one, two, or three of the following: a relatively low molecular weight polymer, multiple injection points, and/or a heated substrate.

In various embodiments of the present invention, a multiple layer glass panel is formed by providing two layers of glass, as described below, that are positioned at a given distance so as to define a space between the two layers. In a preferred embodiment, the two layers of glass are held in position inside of an injection molding mold. In most cases the width of the space will be chosen based on the desired thickness of the polymer interlayer in the final product; the thickness of the polymer layer in the finished product will, typically, approximately correspond to the thickness of the space provided between the two glass layers, with some processing variation.

The glass panels can be held in a relative position prior to polymer injection using any suitable means. For example, vacuum may be used to draw the glass panes against respective mold halves. In an alternate practice, clamps can be applied to fix the outside edges of the glass panes. Clamps can be designed, for example, with gaps defined in a subportion of the clamp to allow for the passage of polymer into or out of the clamped multiple layer glazing. In other examples, a doubly grooved supporting edge piece, or frame, is provided and the two layers of glass are positioned one in each groove, wherein the grooves are formed so as to provide the predetermined distance between the layers of glass. Clamps, guides, frames and/or other supporting members can be provided along part of, or the entire periphery of, glass panels. Appropriate holes and/or gaps may be included to provide for polymer injection or out flow, or gas outflow.

After provision of the glass, formation of the glass panel continues with the injection of a polymer melt (with or without additives) into the space between the glass layers. Processing of thermoplastic polymers into melt form is well known in the art. The polymer melt can be formed by, for example, blending the components during the melting phase immediately before injection molding the melt into the space, or by feeding palletized polymer that has already been blended and thereafter extruded into pellet form. In either case the melted polymer is forced at high pressure into the space between the two glass panels.

In a preferred embodiment, glass panes are placed directly into an injection molding machine against two opposing mold surfaces. The mold surfaces are fabricated in such a way as to evenly support the glass during the subsequent high pressure steps in order to reduce or eliminate glass breakage and to evenly conduct heat to and from the glass. The injection molding machine is then operated in the usual fashion, resulting in the high-pressure injection of a polymer melt into the space between the glass layers within the injection molding machine.

In some embodiments of the present invention the temperature of one or both of the glass layers is raised to ensure complete mold fillage during the injection step. In one example, the glass may be heated prior to loading into the mold. In an alternate case, the glass may be loaded into the mold and subsequently heated through conduction from the mold or alternately from an external heat source. The invention may be practiced by either matching the glass and mold temperatures, or by maintaining dissimilar temperatures. In the case of the latter, the glass may be heated above the temperature of the mold and the injection process carried out before excessive cooling occurs. When mold and glass temperatures are dissimilar, the temperature difference between the two, and the temperature variation across the surfaces, are controlled to prevent them from exceeding the magnitude at which the glass would break from thermal shock.

In some embodiments of the present invention, glass temperature is raised to at least 80° C., 100° C., 150° C., 200° C., or 250° C. prior to injection of the polymer melt. In preferred embodiments, the temperature of the glass is raised to at least 150° C. or at least 200° C., or from 150° C. to 250° C., or 175° C. to 225° C. Injecting poly(vinyl butyral), ethylene-vinyl acetate copolymer, polyurethane polymer melts, or ionomers of partially neutralized ethylene/(meth)acrylic acid copolymer of the present invention between glass panes heated to elevated temperatures that are greater than the solidification point of the polymers—in contradiction to the general practice of injection molding in which the mold is kept at a temperature below or near the solidification point of the injected polymer—results in more complete mold fillage at significantly reduced injection pressures.

In some embodiments of the present invention, the polymer melt is injected into at least two locations around the periphery of the two glass arrangement, and, in some preferred embodiments, the polymer melt is injected through at least 3, 4, 6, or ten locations. In various embodiments, one of the injection gates is formed to abut a portion of one edge of the space or the entire edge of the space. For example, for a windshield, one of the gates may be formed that is equivalent in width to the long or the short dimension of the space formed between the glass. Alternatively, a series of gates can be placed adjacent each other to emulate a large gate having a continuous opening for injection. In such embodiments at least 20 or at least 50 gate can be employed.

In these embodiments, injection locations can vary in any suitable number greater than 1 and can be located adjacent to each other, opposed to each other, or may be distributed in any variation suitable around the periphery of the laminate to favor successful injection into more than one side of the space, for example into two or three sides.

After attachment of the nozzle and upon application of pressure, the polymer melt is forced into the mold cavity between the two panels of glass and the melt proceeds in two or more fronts through the space until the entire space is filled. After the space is filled, the mold can be cooled in order to cool the part prior to ejection. Depending on the end use application, excess polymer at the edges may be trimmed off to finish the panel following ejection.

In some embodiments of the present invention, polymers of the present invention have relatively low molecular weights that facilitate the flow of melted polymer into the space between the glass layers. In various embodiments of the present invention, the polymer has a molecular weight range of 10,000 to 150,000 Daltons, or 40,000 to 100,000 Daltons. In preferred embodiments of the present invention, the polymer has a molecular weight range of less than 150,000 Daltons, less than 100,000 Daltons, or less than 70,000 Daltons. As used herein, the molecular weight range of a polymer means that at least 80% of the molecules fall within the described range. For example, a polymer with a molecular weight of 40,000 to 100,000 has at least 80% of its polymers within the specified range.

In various embodiments of the present invention, two or three of the just-described features—raised substrate temperature, low molecular weight polymer, and multiple point injection—are combined. Combinations, therefore, include raised substrate temperature and low molecular weight polymer, raised glass temperature and multiple point injection, low molecular weight polymer and multiple point injection, and all three together.

One preferred method according to the invention is to use all three features together. A procedure in which a low molecular weight formulation of 10,000 to 125,000 Daltons, forced through 2-6 gates on at least two opposing sides of the part, and injected between glass heated to 100° C. to 250° C. is most preferable In another preferred embodiment, a low molecular weight formulation of 10,000 to 125,000 Daltons is forced through a single gate and injected between glass heated to 100° C. to 250° C.

In yet a further preferred embodiment, a low molecular weight formulation of 10,000 to 125,000 Daltons is forced through 2-6 gates on at least two opposing sides of the part, and injected between glass with a temperature of 20° C. to 80° C.

In another preferred embodiment, a low molecular weight formulation of 10,000 to 125,000 Daltons is forced through a single gate, and injected between glass with a temperature of 20° C. to 80° C.

In another preferred embodiment, a standard, commercially available, molecular weight formulation of 150,000 to 300,000 Daltons is forced through 2-6 gates on at least two opposing sides and injected between glass heated to 100° C. to 250° C.

In yet another preferred embodiment, a molecular weight formulation of 70,000 to 250,000 Daltons is forced through 2-6 gates on at least two opposing sides of the part, and injected between glass heated to 100° C. to 250° C.

In a preferred embodiment, glass is loaded into an open mold and heated to 200° C. The mold is then fully closed so that the glass layers are separated by a distance approximately equal to the desired interlayer thickness in the finished part. A low molecular weight formulation, consisting of a blend of molecules with molecular weights ranging from 40,000 to 100,000 Daltons, is fed to the plasticating screw of the injection molding unit. This formulation is melted in the screw and injected into the cavity through two injection ports. These ports are located across from each other and centered along the two long edges of the part to be laminated. After the cavity is filled, the mold is cooled in order to solidify the melt, and the part is then ejected.

Devices for injection molding melted polymer, or for melting pelletized polymer and then injection molding the melt, are well known in the art (Injection Molding Handbook, $3^{rd}$ edition, Dominick V Rosato, Donald V. Rosato, Marlene G. Rosato, Kluwer Academic publishers, 2000, ISBN 0-7923-8619-1). In one embodiment, a screw type extruder is used to melt the polymer, develop pressure, and feed the melt into a nozzle, runner, and gating system that directs the melt, under pressure, into the space between the glass panels. Other devices that pressurize polymer melt can be used, of course. For example, for embodiments in which a polymer melt is formed by melt blending the various components (resin, plasticizer, additives, etcetera) just prior to injection, the resulting melt can be pressurized and injected into the space without the need for a conventional hopper/pellet/screw device.

A concept commonly referred to in injection molding is the flow-path-to-thickness ratio, or the ratio of the total distance the melt must travel to fill the mold as compared to the mold thickness. The maximum flow-path-to-thickness ratio thus generally describes the greatest distance that a given polymer may be injected, for a given gap, under optimized operating conditions. Most common thermoplastics generally fall in the range of a 100:1 ratio, for materials with poor flow properties, to a 300:1 ratio for material with high flow properties. In a preferred embodiment, the invention enables the production of laminated glass containing plasticized poly(vinyl butyral) by melt injection into cavities with flow-to-path ratios ranging of 200:1 up to 1250:1. For average sized automotive parts, such as the 750 mm by 1250 mm part described in the examples, the present invention enables the production of these parts with polymeric interlayer thicknesses ranging from 0.3 mm up to approximately 2 mm.

Any suitable injection pressure can be used, and, in various embodiments of the present invention, injection pressures of less than $1.7 \times 10^8$ Pascals, $1.4 \times 10^8$ Pascals, $0.85 \times 10^8$ Pascals, or $0.3 \times 10^8$ Pascals are used.

The space between the glass panes can be any suitable thickness, and will generally be determined by the intended use of the panel and the properties of the polymer melt being used. In various embodiments, the space can be 0.1 and 4.0 millimeters, 0.2 to 2.0 millimeters, 0.25 to 1.0 millimeters, or 0.3 to 0.7 millimeters in thickness.

The glass panels can be any suitable size, and in various embodiments, the surface area of each glass panel in contact with the polymer melt is greater than 200, 500, or 1000 square centimeters. In other embodiments, the surface area of each glass panel in contact with the polymer melt is greater than 2000, 5,000, 10,000, or 20,000 square centimeters.

In further embodiments of the present invention, one or more of the glass panes in any of the above-described embodiments is replaced with a rigid polymer film substrate. Polymer films will be described in detail, below. In these embodiments, a polymer film is used to form one boundary to the space into which the polymer melt is injected. The polymer film, as with the glass, is typically supported by the metal mold. The resulting glazing construct, glass/interlayer/polymer film, is known as a bilayer and has many useful applications.

In yet further embodiments, two polymer films are used as rigid substrates to form a polymer film/interlayer/polymer film embodiment.

In other embodiments, one or more glass layers are replaced with a rigid thick plastic layer such as an acrylic such as Plexiglass®, a polycarbonate such as Lexan®, and other plastics that are conventionally used as glazings.

In other embodiments additional injections are made to the exterior of the laminate either during the initial injection or as a subsequent step. The purpose of this secondary injection is to affix additional polymer films or components to increase the functionality of the final part. In automotive glazings, for examples, mirror buttons, mounting clips, or gasketing may be injected onto the part.

In various embodiments of the present invention, in addition to any one or a combination of the features of heated glass, low molecular weight polymer, and multiple injection points, the formation of a multiple layer glass panel is accomplished using compression, which begins with two layers of glass separated by a given distance, and, typically, parallel to each other. The initial gap between the glass layers is greater than the gap that will separate the two layers in the final multiple layer glass product. Polymer melt is then injected into the space between the two glass layers. The total quantity of injected melt is, in some embodiments, sufficient to completely fill the gap between the glass in the finished part, and thus insufficient to fill the entire initial gap. Following the melt injection, force is exerted on the exterior of one or both of the two glass layers in a manner to compress the glass layers toward each other and diminish the space between the layers to the desired finished specifications. During this compression step, polymer melt is formed into a continuous layer that is in contact with both glass layers on the two inside surfaces.

Figure 2:
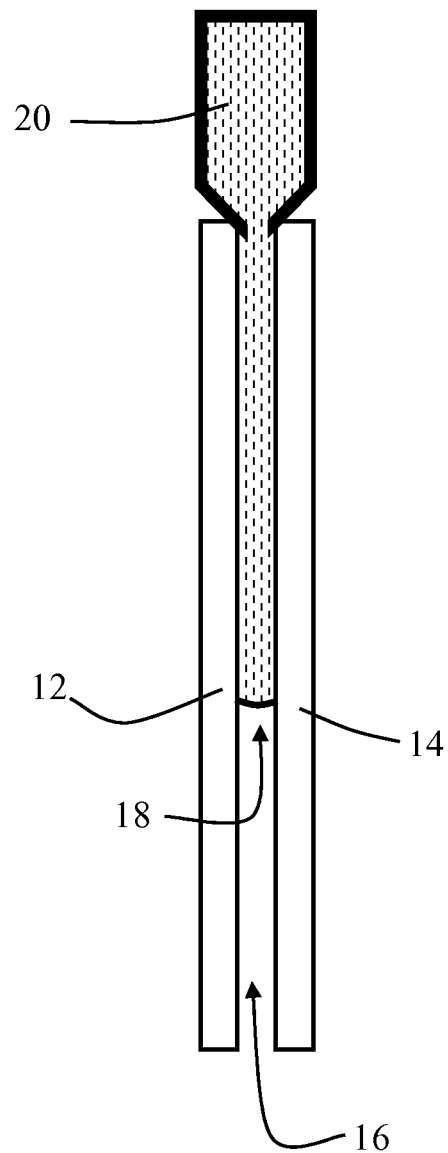
FIG. 2 represents a schematic, cross-sectional view of a two glass layer injection molding process that insufficiently fills the space between the glass layers.

The injection/compression process is shown schematically in FIGS. 1 through 4. In FIG. 1, two layers of glass 12, 14 that are ready for polymer melt injection are shown generally at 10. The space formed between the two layers of glass is shown as 16. FIG. 2, which is a representation of the limitations of conventional injection molding, shows the two layers of glass 12, 14 in FIG. 1 with a polymer injection device 20 injecting polymer into the space 16. As shown in FIG. 2, because of the relatively small distance between the two layers of glass 12, 14, the injected polymer front 18 cannot be forced to the end of the space, resulting in a portion of the space having air or an incomplete polymer layer. Obviously such a result is undesirable. This flow limitation has been an impediment to the development of injection molding of multiple layer glazings.

Figure 3:
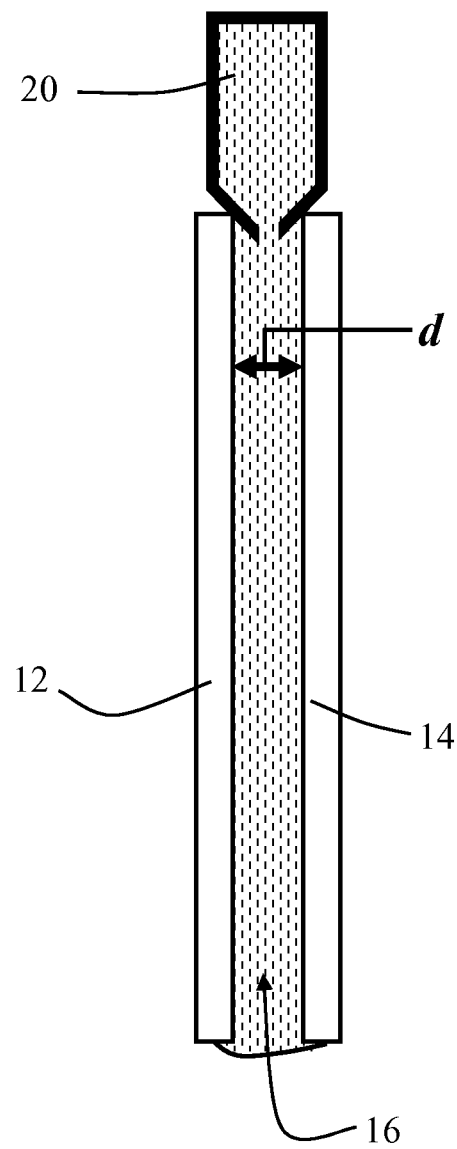
FIG. 3 represents a schematic, cross-sectional view of a compression injection molding method of the present invention.
Figure 4:
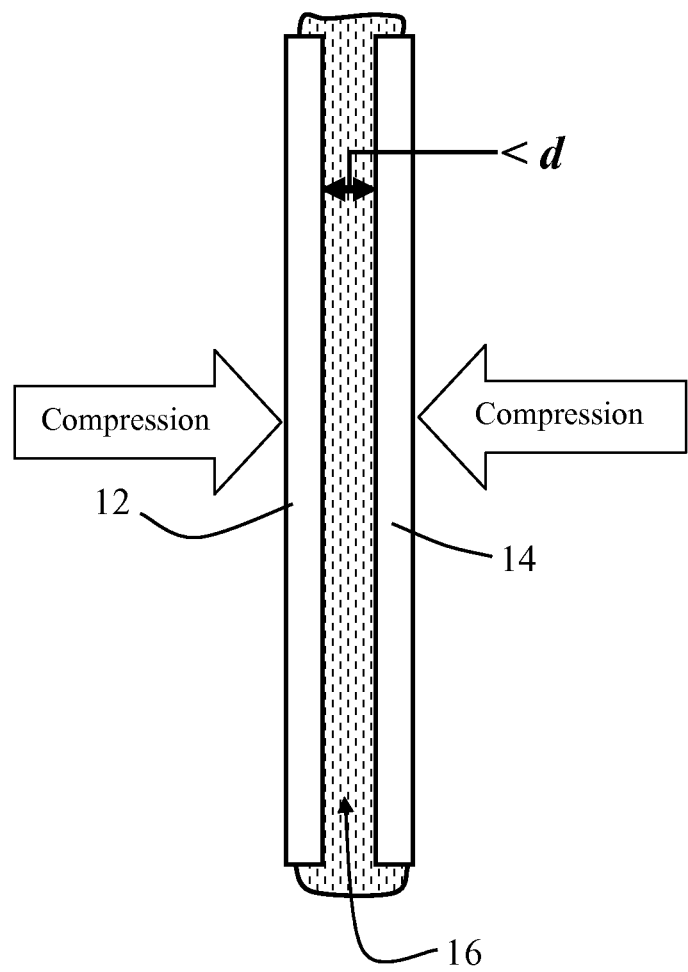
FIG. 4 represents a schematic, cross-sectional view of a compression injection molding method of the present invention.

FIG. 3 shows an injection process of the present invention in which, in addition to providing one or more of the three features described above (low molecular weight polymer, 2 or more gates, and heated glazing substrate), the distance, d, between the two layers of glass 12, 14 has been increased for the initial injection step. The added distance between the layers 12, 14 allows the injection device 20 to effectively inject the polymer melt throughout the entire space 16 without any air gaps or non-continuous sections of polymer melt. FIG. 4 shows the compression step, in which the layers of glass 12, 14 are compressed, decreasing the distance between the glass layers some distance less than "d". During the compression step, excess polymer melt is expelled through any openings around the edges of the glass layers 12, 14. The excess, expelled polymer can be removed by simple trimming after cooling and solidification of the polymer melt.

The width, "d", of the space and the amount of the compression of the glass layers will be chosen based on the desired thickness of the polymer interlayer in the final product and the processing parameters of the polymer melt and the injection apparatus being used. The thickness of the polymer layer in the finished product will approximately correspond to the final, reduced distance between the two glass layers, with some processing variation.

In various embodiments of the present invention, the distance "d" can be 0.25 millimeters to 10.0 millimeters. In various embodiments, the distance "d" can be reduced through compression to less than 75%, less than 50%, or less than 25% of the original distance "d". In various embodiments, the distance "d" is reduced 0.1 millimeters to 7.5 millimeters.

The polymer melts of the present invention can comprise any suitable polymer, and, in preferred embodiments, the polymer melt comprises poly(vinyl butyral), polyurethane, ethylene-vinyl acetate copolymer, or ionomers of partially neutralized ethylene/(meth)acrylic acid copolymer. In preferred embodiments, the preferred polymer is poly(vinyl butyral) or polyurethane. In a preferred embodiment the preferred polymer is poly(vinyl butyral). In a preferred embodiment the preferred polymer is polyurethane.

In any of the embodiments of the present invention given herein that comprise poly(vinyl butyral) as the polymeric component of the polymer melt, another embodiment is included in which the polymer component consists of or consists essentially of poly(vinyl butyral). In these embodiments, any of the variations in additives, including plasticizers, disclosed herein can be used with the polymer melt having a polymer consisting of or consisting essentially of poly(vinyl butyral).

In one embodiment, the polymer melt comprises a polymer based on partially acetalized poly(vinyl alcohol)s. In further embodiments the polymer melt comprises poly(vinyl butyral) and one or more other polymers. In any of the sections herein in which preferred ranges, values, and/or methods are given specifically for poly(vinyl butyral) (for example, and without limitation, for plasticizers, component percentages, thicknesses, and characteristic-enhancing additives), those ranges also apply, where applicable, to the other polymers and polymer blends disclosed herein as useful as components in polymer melts.

For embodiments comprising poly(vinyl butyral), the poly(vinyl butyral) can be produced by any suitable method. Details of suitable processes for making poly(vinyl butyral) are known to those skilled in the art (see, for example, U.S. Pat. Nos. 2,282,057 and 2,282,026). In one embodiment, the solvent method described in Vinyl Acetal Polymers, in Encyclopedia of Polymer Science & Technology, $3^{rd}$ edition, Volume 8, pages 381-399, by B. E. Wade (2003) can be used. In another embodiment, the aqueous method described therein can be used. Poly(vinyl butyral) is commercially available in various forms from, for example, Solutia Inc., St. Louis, Mo. as Butvar™ resin.)

In various embodiments, the resin used to form polymer melt comprising poly(vinyl butyral) comprises 10 to 35 weight percent (wt. %) hydroxyl groups calculated as poly(vinyl alcohol), 13 to 30 wt. % hydroxyl groups calculated as poly(vinyl alcohol), or 15 to 22 wt. % hydroxyl groups calculated as poly(vinyl alcohol). The resin can also comprise less than 15 wt. % residual ester groups, 13 wt. %, 11 wt. %, 9 wt. %, 7 wt. %, 5 wt. %, or less than 3 wt. % residual ester groups calculated as polyvinyl acetate, with the balance being an acetal, preferably butyraldehyde acetal, but optionally including other acetal groups in a minor amount, e.g., a 2-ethyl hexanal group (see, for example, U.S. Pat. No. 5,137,954).

Various adhesion control agents can be used in polymer melts of the present invention, including sodium acetate, potassium acetate, and magnesium salts. Magnesium salts that can be used with these embodiments of the present invention include, but are not limited to, those disclosed in U.S. Pat. No. 5,728,472, such as magnesium salicylate, magnesium nicotinate, magnesium di-(2-aminobenzoate), magnesium di-(3-hydroxy-2-napthoate), and magnesium bis(2-ethyl butyrate) (chemical abstracts number 79992-76-0). In various embodiments of the present invention the magnesium salt is magnesium bis(2-ethyl butyrate).

Additives may be incorporated into the polymer melt to enhance its performance in a final multiple layer glazing product. Such additives include, but are not limited to, the following agents: antiblocking agents, plasticizers, dyes, pigments, stabilizers (e.g., ultraviolet stabilizers), antioxidants, flow modifiers, reinforcing fillers, impact modifiers, flame retardants, IR absorbers, and combinations of the foregoing additives, and the like, as are known in the art. In a preferred embodiment, polymer melts of the present invention include one or more lubricant additives, flow modifiers, light stabilizers, mold release agents, or thermal stabilizers.

In various embodiments of polymer melts of the present invention, the polymer melts can comprise 5 to 60, 25 to 60, 5 to 80, 10 to 70, or 20 to 80 parts plasticizer per one hundred parts of resin (phr). Of course other quantities can be used as is appropriate for the particular application. In some embodiments, the plasticizer has a hydrocarbon segment of fewer than 20, fewer than 15, fewer than 12, or fewer than 10 carbon atoms.

The amount of plasticizer can be adjusted to affect the glass transition temperature ($T_g$) of the poly(vinyl butyral) layer that is formed from the melt. In general, higher amounts of plasticizer are added to decrease the $T_g$. Poly(vinyl butyral) polymer interlayers formed from melts of the present invention can have a $T_g$ of, for example, 40° C. or less, 35° C. or less, 30° C. or less, 25° C. or less, 20° C. or less, and 15° C. or less.

Any suitable plasticizers can be added to the polymer resins of the present invention in order to form the polymer melts. Plasticizers used in the polymer melts of the present invention can include esters of a polybasic acid or a polyhydric alcohol, among others. Suitable plasticizers include, for example, triethylene glycol di-(2-ethylbutyrate), triethylene glycol di-(2-ethylhexanoate), triethylene glycol diheptanoate, tetraethylene glycol diheptanoate, dihexyl adipate, dioctyl adipate, hexyl cyclohexyladipate, mixtures of heptyl and nonyl adipates, diisononyl adipate, heptylnonyl adipate, dibutyl sebacate, polymeric plasticizers such as the oil-modified sebacic alkyds, and mixtures of phosphates and adipates such as disclosed in U.S. Pat. No. 3,841,890 and adipates such as disclosed in U.S. Pat. No. 4,144,217, and mixtures and combinations of the foregoing. Other plasticizers that can be used are mixed adipates made from $C_4$ to $C_9$ alkyl alcohols and cyclo $C_4$ to $C_{10}$ alcohols, as disclosed in U.S. Pat. No. 5,013,779 and $C_6$ to $C_8$ adipate esters, such as hexyl adipate. In various embodiments, the plasticizer used is dihexyl adipate and/or triethylene glycol di-2 ethylhexanoate.

Various embodiments include ethylene-vinyl acetate copolymer (also called poly(ethylene-co-vinyl acetate)) as described in U.S. Pat. No. 4,614,781, U.S. Pat. No. 5,415,909, U.S. Pat. No. 5,352,530, and U.S. Pat. No. 4,935,470. Various embodiments include polyurethane comprising, for example, aliphatic isocyanate polyether based polyurethane (available from Thermedics Polymer Products of Noveon Inc.). In embodiments comprising ionomers of partially neutralized ethylene/(meth)acrylic acid copolymer, a preferred ionomer is Surlyn®, which is available from DuPont. Other additives can be incorporated into the polyurethane resins during melt formation, such as UV stabilizers and functional chemicals to provide high adhesion to glass.

In a preferred embodiment, plasticized poly(vinyl butyral) pellets such as those disclosed in pending U.S. application Ser. No. 11/264,510 are used to form the polymer melt. Such pellets can be hopper fed into a conventional injection molding machine to produce a poly(vinyl butyral) melt.

As used herein, a "polymer film" means a relatively thin and rigid polymer layer that functions as a rigid substrate or as a performance enhancing layer. Polymer films differ from the interlayers formed from polymer melts in that polymer films do not themselves provide the necessary penetration resistance and glass retention properties to a multiple layer glazing structure. Poly(ethylene terephthalate) is most commonly used as a polymer film.

In various embodiments, the polymer film layer has a thickness of 0.013 mm to 0.20 mm, preferably 0.025 mm to 0.1 mm, or 0.04 to 0.06 mm. The polymer film layer can optionally be surface treated or coated to improve one or more properties, such as adhesion or infrared radiation reflection. These functional performance layers include, for example, a multi-layer stack for reflecting infrared solar radiation and transmitting visible light when exposed to sunlight. This multi-layer stack is known in the art (see, for example, WO 88/01230 and U.S. Pat. No. 4,799,745) and can comprise, for example, one or more Angstroms-thick metal layers and one or more (for example two) sequentially deposited, optically cooperating dielectric layers. As is also known, (see, for example, U.S. Pat. Nos. 4,017,661 and 4,786,783), the metal layer(s) may optionally be electrically resistance heated for defrosting or defogging of any associated glass layers.

An additional type of polymer film that can be used with the present invention, which is described in U.S. Pat. No. 6,797,396, comprises a multitude of nonmetallic layers that function to reflect infrared radiation without creating interference that can be caused by metallic layers.

The polymer film layer, in some embodiments, is optically transparent (i.e. objects adjacent one side of the layer can be comfortably seen by the eye of a particular observer looking through the layer from the other side), and usually has a greater, in some embodiments significantly greater, tensile modulus regardless of composition than that of any adjacent polymer layer. In various embodiments, the polymer film layer comprises a thermoplastic material. Among thermoplastic materials having suitable properties are nylons, polyurethanes, acrylics, polycarbonates, polyolefins such as polypropylene, cellulose acetates and triacetates, vinyl chloride polymers and copolymers and the like. In various embodiments, the polymer film layer comprises materials such as re-stretched thermoplastic films having the noted properties, which include polyesters, for example poly(ethylene terephthalate) and poly(ethylene terephthalate) glycol (PETG). In various embodiments, poly(ethylene terephthalate) is used, and, in various embodiments, the poly(ethylene terephthalate) has been biaxially stretched to improve strength, and has been heat stabilized to provide low shrinkage characteristics when subjected to elevated temperatures (e.g. less than 2% shrinkage in both directions after 30 minutes at 150° C.).

Various coating and surface treatment techniques for poly(ethylene terephthalate) film that can be used with the present invention are disclosed in published European Application No. 0157030. Polymer films of the present invention can also include a hardcoat and/or and antifog layer, as are known in the art.

There are many advantages to the injection molding methods of the present invention. The difficulties encountered with the production, storage, and handling of polymer sheets are obviated, for example, which can significantly reduce costs. Additionally, the injection molding processes disclosed herein are much simpler than the multi-step processes that currently exist, which can require, for example, multiple heating steps, autoclave conditions, and other procedurally arduous steps.

Example 1

The following table represents a computer generated modeling of injection molded flow characteristics for injection of low molecular weight plasticized poly(vinyl butyral) having a molecular weight range of 40,000 to 100,000, heated to a melt temperature of 220° C. The polymer melt is fed from a series of 51 injection ports spaced evenly along one of the long edges of the part to be filled. The dimensions of the cavity are 1250 mm wide by 750 mm long by 1.2 mm thick. The injection surfaces are heated to 50° C. For the purposes of the simulation, injection time is assumed to be approximately 5 seconds, and the maximum injection pressure supplied by the equipment is limited to $1.72 \times 10^8$ Pascals (25,000 pounds per square inch). Simulations for this and other examples were run using the Moldflow® software package (Moldflow Corporation, Framingham, Mass.).

| Time (Seconds) | Volume Percent | Pressure (Pascals) |
|---|---|---|
| 0.23 | 4.91 | 2.58E+06 |
| 0.47 | 9.51 | 6.80E+06 |
| 0.69 | 13.68 | 1.28E+07 |
| 0.9 | 17.66 | 2.00E+07 |
| 1.13 | 21.8 | 2.84E+07 |
| 1.36 | 26.06 | 3.90E+07 |
| 1.58 | 30.05 | 4.94E+07 |
| 1.8 | 34.09 | 6.06E+07 |
| 2.04 | 38.39 | 7.35E+07 |
| 2.25 | 42.33 | 8.51E+07 |
| 2.53 | 47.41 | 1.02E+08 |
| 2.71 | 50.67 | 1.12E+08 |
| 2.93 | 54.83 | 1.26E+08 |
| 3.16 | 59.27 | 1.41E+08 |
| 3.38 | 63.51 | 1.55E+08 |
| 3.61 | 67.79 | 1.70E+08 |
| 3.83 | 71.88 | 1.72E+08 |

-continued

| Time (Seconds) | Volume Percent | Pressure (Pascals) |
|---|---|---|
| 4.07 | 75.15 | 1.72E+08 |
| 4.29 | 77.24 | 1.72E+08 |
| 4.5 | 78.57 | 1.72E+08 |
| 4.78 | 79.69 | 1.72E+08 |
| 5 | 80.2 | 1.72E+08 |
| 5.24 | 80.56 | 1.72E+08 |
| 5.48 | 80.78 | 1.72E+08 |
| 6.09 | 81.05 | 1.72E+08 |

Example 2

The following table represents a computer generated modeling of injection molded flow characteristics for injection of the same poly(vinyl butyral) as in Example 1 but with injection surfaces heated to 100° C.

| Time (Seconds) | Volume Percent | Pressure (Pascals) |
|---|---|---|
| 0.23 | 4.9 | 2.28E+06 |
| 0.45 | 9.45 | 5.42E+06 |
| 0.7 | 14.23 | 1.03E+07 |
| 0.9 | 18.22 | 1.49E+07 |
| 1.13 | 22.48 | 2.06E+07 |
| 1.36 | 26.9 | 2.71E+07 |
| 1.58 | 31.17 | 3.38E+07 |
| 1.8 | 35.55 | 4.13E+07 |
| 2.04 | 40.08 | 4.91E+07 |
| 2.28 | 44.59 | 5.75E+07 |
| 2.48 | 48.46 | 6.43E+07 |
| 2.71 | 52.78 | 7.33E+07 |
| 2.93 | 57.08 | 8.17E+07 |
| 3.15 | 61.5 | 9.11E+07 |
| 3.38 | 66 | 9.99E+07 |
| 3.61 | 70.51 | 1.10E+08 |
| 3.83 | 74.84 | 1.19E+08 |
| 4.05 | 79.21 | 1.29E+08 |
| 4.29 | 83.91 | 1.38E+08 |
| 4.5 | 88.12 | 1.48E+08 |
| 4.73 | 92.8 | 1.58E+08 |
| 4.95 | 97.13 | 1.68E+08 |
| 5.05 | 99.04 | 1.71E+08 |
| 5.06 | 100 | 1.36E+08 |

Example 3

The following table represents a computer generated modeling of injection molded flow characteristics for injection of the same poly(vinyl butyral) as in Example 1 but with injection surfaces heated to 150° C.

| Time (Seconds) | Volume Percent | Pressure (Pascals) |
|---|---|---|
| 0.24 | 4.91 | 1.91E+06 |
| 0.47 | 9.55 | 4.02E+06 |
| 0.71 | 14.14 | 6.96E+06 |
| 0.95 | 18.89 | 9.82E+06 |
| 1.18 | 23.31 | 1.33E+07 |
| 1.43 | 28.18 | 1.68E+07 |
| 1.65 | 32.56 | 2.04E+07 |
| 1.89 | 37.17 | 2.42E+07 |
| 2.13 | 41.93 | 2.82E+07 |
| 2.36 | 46.25 | 3.21E+07 |
| 2.62 | 51.21 | 3.60E+07 |
| 2.83 | 55.22 | 4.03E+07 |
| 3.06 | 59.69 | 4.44E+07 |
| 3.3 | 64.4 | 4.91E+07 |
| 3.53 | 68.98 | 5.33E+07 |
| 3.77 | 73.59 | 5.82E+07 |
| 4 | 78.26 | 6.27E+07 |
| 4.24 | 83.01 | 6.76E+07 |
| 4.47 | 87.42 | 7.21E+07 |
| 4.7 | 91.99 | 7.68E+07 |
| 4.98 | 97.47 | 8.24E+07 |
| 5.06 | 99.12 | 8.38E+07 |
| 5.07 | 100 | 6.70E+07 |

Example 4

The following table represents a computer generated modeling of injection molded flow characteristics for injection of the same poly(vinyl butyral) as in Example 1 but with injection surfaces heated to 200° C.

| Time (Seconds) | Volume Percent | Pressure (Pascals) |
|---|---|---|
| 0.24 | 4.92 | 1.53E+06 |
| 0.49 | 9.83 | 2.80E+06 |
| 0.73 | 14.57 | 4.52E+06 |
| 0.97 | 19.48 | 6.15E+06 |
| 1.21 | 24.09 | 7.64E+06 |
| 1.45 | 28.95 | 9.43E+06 |
| 1.68 | 33.62 | 1.08E+07 |
| 1.92 | 38.3 | 1.27E+07 |
| 2.16 | 43.11 | 1.44E+07 |
| 2.41 | 48.05 | 1.60E+07 |
| 2.67 | 53.01 | 1.79E+07 |
| 2.88 | 57.33 | 1.94E+07 |
| 3.13 | 62.31 | 2.13E+07 |
| 3.39 | 67.39 | 2.33E+07 |
| 3.6 | 71.78 | 2.48E+07 |
| 3.85 | 76.61 | 2.67E+07 |
| 4.09 | 81.48 | 2.85E+07 |
| 4.32 | 86.13 | 3.02E+07 |
| 4.57 | 91.11 | 3.22E+07 |
| 4.81 | 96.01 | 3.39E+07 |
| 4.97 | 99.19 | 3.51E+07 |
| 4.98 | 100 | 2.80E+07 |

Example 5

Figure 5:
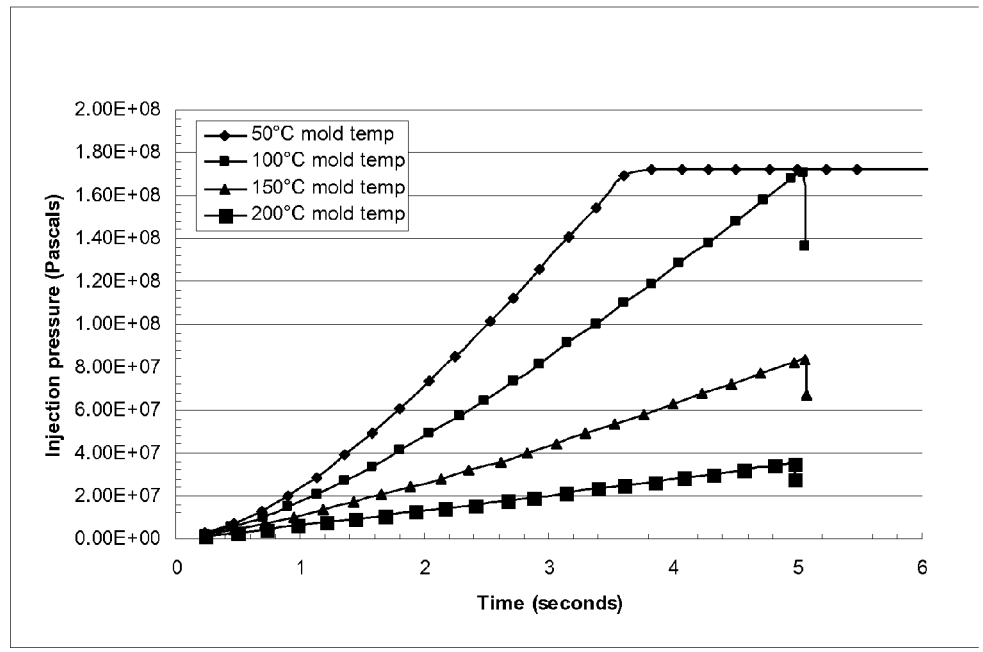
FIG. 5 represents increase in injection pressure over time for four example injection molded glazings.

Increase in injection pressure over time for the four examples above is provided in FIG. 5.

Example 6

Figure 6:
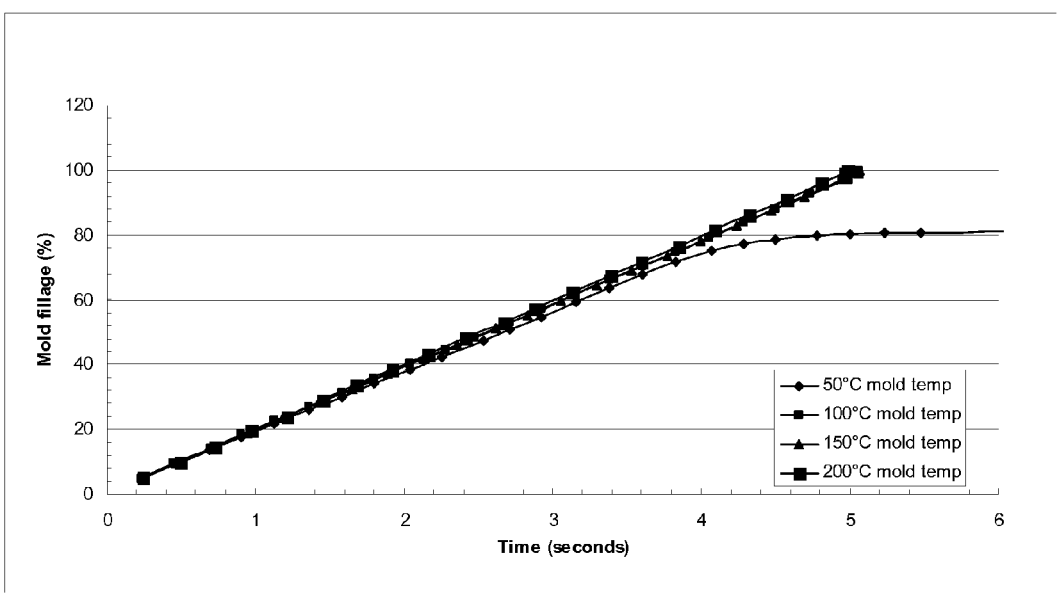
FIG. 6 represents mold volume filled over time for four example injection molded glazings.

Mold volume filled over time for the four examples above is provided in FIG. 6.

Example 7

The following table represents a computer generated modeling of injection molded flow characteristics for a low molecular weight poly(vinyl butyral) ("Low MW PVB") into a 1.8 millimeter gap. Low molecular weight poly(vinyl butyral) refers to a plasticized poly(vinyl butyral) having a molecular weight range of 40,000 to 100,000. The formulation is heated to a melt temperature of 220° C. prior to injection. The polymer melt is fed from a single gate into a cavity. The cavity is 1250 millimeters wide by 750 millimeters long, and the gate is centered at the edge of the 1250 millimeter side. The injection surfaces are heated to 50° C. For the purposes of the simulation, injection time is assumed to be approximately 5 seconds, and the maximum injection pressure supplied by the equipment is limited to $1.72 \times 10^8$ Pascals (25,000 pounds per square inch).

| Time (Seconds) | Volume Percent | Pressure (Pascals) |
|---|---|---|
| 0.24 | 2.93 | 1.23E+07 |
| 0.48 | 7.27 | 1.86E+07 |
| 0.73 | 11.81 | 2.39E+07 |
| 0.97 | 16.33 | 2.86E+07 |
| 1.2 | 20.75 | 3.29E+07 |
| 1.45 | 25.39 | 3.73E+07 |
| 1.69 | 30.05 | 4.16E+07 |
| 1.93 | 34.63 | 4.58E+07 |
| 2.17 | 39.19 | 4.98E+07 |
| 2.41 | 43.83 | 5.39E+07 |
| 2.65 | 48.44 | 5.79E+07 |
| 2.88 | 52.93 | 6.18E+07 |
| 3.12 | 57.56 | 6.57E+07 |
| 3.37 | 62.34 | 6.98E+07 |
| 3.61 | 66.89 | 7.40E+07 |
| 3.85 | 71.53 | 8.01E+07 |
| 4.09 | 76.04 | 8.62E+07 |
| 4.33 | 80.41 | 9.20E+07 |
| 4.57 | 84.99 | 9.78E+07 |
| 4.8 | 89.35 | 1.04E+08 |
| 5.05 | 93.71 | 1.14E+08 |
| 5.28 | 97.71 | 1.28E+08 |
| 5.37 | 99 | 1.34E+08 |
| 5.38 | 99.16 | 1.07E+08 |
| 5.45 | 99.97 | 1.07E+08 |
| 5.46 | 100 | 1.07E+08 |

Example 8

The following table represents a computer generated modeling of injection molded flow characteristics exactly as in Example 7, but wherein the cavity has a 2.8 millimeter width:

| Time (Seconds) | Volume Percent | Pressure (Pascals) |
|---|---|---|
| 0.24 | 3.91 | 6.47E+06 |
| 0.48 | 8.67 | 8.80E+06 |
| 0.73 | 13.49 | 1.06E+07 |
| 0.96 | 18.14 | 1.21E+07 |
| 1.21 | 23.02 | 1.36E+07 |
| 1.44 | 27.72 | 1.49E+07 |
| 1.68 | 32.54 | 1.63E+07 |
| 1.92 | 37.31 | 1.76E+07 |
| 2.16 | 42.1 | 1.88E+07 |
| 2.41 | 46.96 | 2.01E+07 |
| 2.65 | 51.77 | 2.14E+07 |
| 2.88 | 56.38 | 2.26E+07 |
| 3.14 | 61.44 | 2.39E+07 |
| 3.36 | 65.96 | 2.51E+07 |
| 3.61 | 70.86 | 2.69E+07 |
| 3.84 | 75.42 | 2.88E+07 |
| 4.09 | 80.3 | 3.09E+07 |
| 4.32 | 84.78 | 3.29E+07 |
| 4.57 | 89.59 | 3.50E+07 |
| 4.8 | 94.01 | 3.84E+07 |
| 5.05 | 98.54 | 4.37E+07 |
| 5.07 | 99.02 | 4.45E+07 |
| 5.09 | 99.23 | 3.56E+07 |
| 5.15 | 99.98 | 3.56E+07 |
| 5.15 | 100 | 3.56E+07 |

Example 9

The following table represents a computer generated modeling of injection molded flow characteristics exactly as in Example 7, but wherein the poly(vinyl butyral) is "standard" poly(vinyl butyral) ("Std. PVB"), which means a plasticized poly(vinyl butyral) having a molecular weight range of 150,000 to 300,000 Daltons:

| Time (Seconds) | Volume Percent | Pressure (Pascals) |
|---|---|---|
| 0.24 | 1.63 | 2.76E+07 |
| 0.48 | 4.9 | 4.73E+07 |
| 0.73 | 8.83 | 6.37E+07 |
| 0.97 | 12.88 | 7.73E+07 |
| 1.21 | 17.13 | 8.95E+07 |
| 1.45 | 21.42 | 1.01E+08 |
| 1.68 | 25.66 | 1.11E+08 |
| 1.93 | 30.23 | 1.22E+08 |
| 2.16 | 34.45 | 1.31E+08 |
| 2.41 | 39.15 | 1.41E+08 |
| 2.65 | 43.54 | 1.50E+08 |
| 2.88 | 47.89 | 1.58E+08 |
| 3.12 | 52.39 | 1.66E+08 |
| 3.37 | 57.06 | 1.72E+08 |
| 3.62 | 61.16 | 1.72E+08 |
| 3.85 | 64.27 | 1.72E+08 |
| 4.1 | 66.81 | 1.72E+08 |
| 4.33 | 68.58 | 1.72E+08 |
| 4.61 | 70.16 | 1.72E+08 |
| 4.8 | 70.98 | 1.72E+08 |
| 5.09 | 71.95 | 1.72E+08 |
| 5.33 | 72.57 | 1.72E+08 |
| 5.65 | 73.2 | 1.72E+08 |
| 5.86 | 73.51 | 1.72E+08 |
| 6.1 | 73.82 | 1.72E+08 |
| 6.4 | 74.11 | 1.72E+08 |
| 6.84 | 74.43 | 1.72E+08 |
| 7.48 | 74.73 | 1.72E+08 |
| 8.65 | 75.03 | 1.72E+08 |

Example 10

The following table represents a computer generated modeling of injection molded flow characteristics exactly as in Example 9, but wherein the cavity has a 2.8 millimeter width:

| Time (Seconds) | Volume Percent | Pressure (Pascals) |
|---|---|---|
| 0.24 | 2.3 | 1.84E+07 |
| 0.48 | 6.21 | 2.92E+07 |
| 0.72 | 10.48 | 3.73E+07 |
| 0.96 | 14.91 | 4.41E+07 |
| 1.2 | 19.37 | 5.01E+07 |
| 1.44 | 23.9 | 5.58E+07 |
| 1.68 | 28.46 | 6.09E+07 |
| 1.92 | 33.07 | 6.60E+07 |
| 2.17 | 37.89 | 7.08E+07 |
| 2.41 | 42.5 | 7.54E+07 |
| 2.65 | 47.13 | 7.98E+07 |
| 2.88 | 51.6 | 8.38E+07 |
| 3.12 | 56.23 | 8.79E+07 |
| 3.37 | 60.97 | 9.19E+07 |
| 3.62 | 65.82 | 9.60E+07 |
| 3.85 | 70.25 | 1.01E+08 |
| 4.08 | 74.62 | 1.07E+08 |
| 4.33 | 79.33 | 1.12E+08 |
| 4.56 | 83.66 | 1.18E+08 |
| 4.81 | 88.45 | 1.23E+08 |
| 5.05 | 92.61 | 1.32E+08 |
| 5.29 | 96.7 | 1.44E+08 |
| 5.43 | 99 | 1.53E+08 |
| 5.45 | 99.21 | 1.23E+08 |
| 5.53 | 99.94 | 1.23E+08 |
| 5.54 | 99.98 | 1.23E+08 |
| 5.55 | 100 | 1.23E+08 |

Example 11

Figure 7:
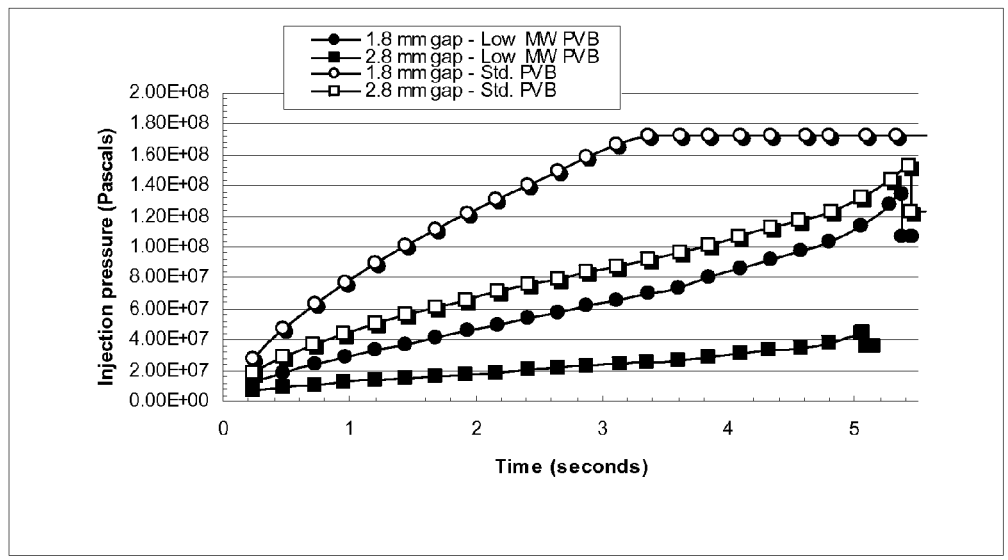
FIG. 7 represents increase in injection pressure over time for an injection molded glazing with four different gap and molecular weight configurations.

A graph of injection pressure over time for the data given above in Examples 7 through 10 is shown in FIG. 7.

Example 12

Figure 8:
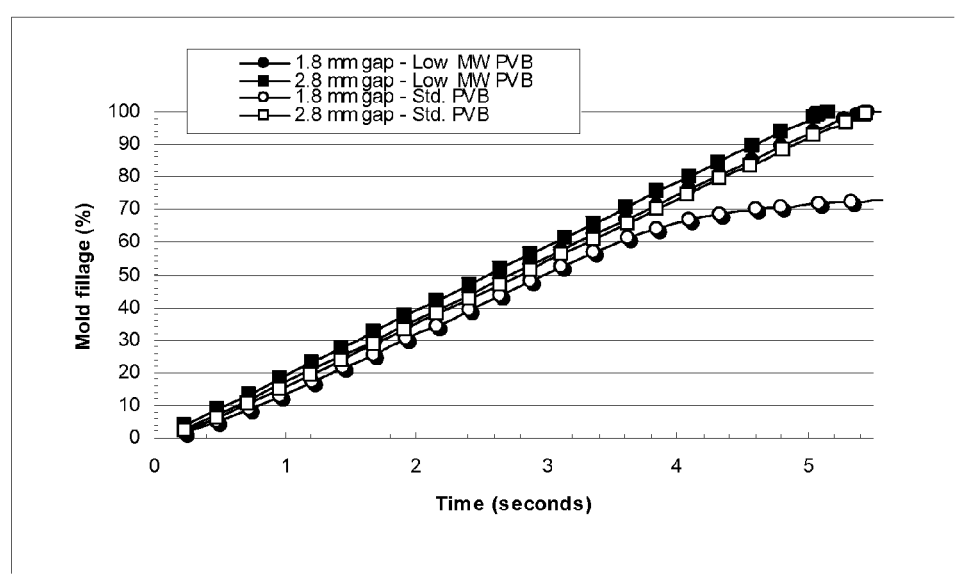
FIG. 8 represents mold volume filled over time for an injection molded glazing with four different gap and molecular weight configurations.

A graph of mold fillage percentage over time for the data given above in Examples 7 through 10 is shown in FIG. 8.

Example 13

The following table represents a computer generated modeling of injection molded flow characteristics for injecting a plasticized poly(vinyl butyral) having a molecular weight range of 40,000 to 100,000 heated to a melt temperature of 220° C. prior to injection into a 1.2 millimeter thick cavity through a single gate. The dimensions of the cavity are 1250 millimeters wide by 750 millimeters long. The single gate is centered at the edge of the 1250 millimeter side. The injection surfaces are heated to 200° C. For the purposes of the simulation, injection time is assumed to be approximately 5 seconds, and the maximum injection pressure supplied by the equipment is limited to 1.72×108 Pascals (25,000 pounds per square inch).

| Time (Seconds) | Volume Percent | Pressure (Pascals) |
|---|---|---|
| 0.24 | 1.95 | 2.49E+07 |
| 0.47 | 5.79 | 3.84E+07 |
| 0.71 | 10.11 | 4.73E+07 |
| 0.94 | 14.59 | 5.33E+07 |
| 1.18 | 19.32 | 5.81E+07 |
| 1.42 | 24.06 | 6.21E+07 |
| 1.65 | 28.66 | 6.55E+07 |
| 1.89 | 33.54 | 6.87E+07 |
| 2.12 | 38.2 | 7.15E+07 |
| 2.35 | 42.91 | 7.41E+07 |
| 2.6 | 47.95 | 7.66E+07 |
| 2.82 | 52.56 | 7.87E+07 |
| 3.07 | 57.67 | 8.08E+07 |
| 3.31 | 62.58 | 8.28E+07 |
| 3.53 | 67.24 | 8.48E+07 |
| 3.77 | 71.98 | 8.86E+07 |
| 4.01 | 76.64 | 9.25E+07 |
| 4.23 | 81.14 | 9.63E+07 |
| 4.47 | 85.85 | 1.00E+08 |
| 4.71 | 90.62 | 1.05E+08 |
| 4.94 | 94.74 | 1.13E+08 |
| 5.17 | 98.72 | 1.26E+08 |
| 5.19 | 99.04 | 1.27E+08 |
| 5.21 | 99.21 | 1.02E+08 |
| 5.27 | 99.97 | 1.02E+08 |
| 5.28 | 100 | 1.02E+08 |

Example 14

The following table represents a computer generated modeling of injection molded flow characteristics exactly as in Example 13, but wherein a second gate is used and is positioned opposite the first gate, centered on the second 1250 mm edge:

| Time (Seconds) | Volume Percent | Pressure (Pascals) |
|---|---|---|
| 0.24 | 2.67 | 1.79E+07 |
| 0.48 | 6.9 | 2.54E+07 |
| 0.71 | 11.42 | 3.01E+07 |
| 0.95 | 16.16 | 3.35E+07 |
| 1.18 | 20.82 | 3.61E+07 |
| 1.42 | 25.73 | 3.83E+07 |
| 1.66 | 30.65 | 4.03E+07 |
| 1.89 | 35.5 | 4.20E+07 |
| 2.12 | 40.25 | 4.35E+07 |
| 2.36 | 45.31 | 4.50E+07 |
| 2.6 | 50.11 | 4.68E+07 |
| 2.82 | 54.6 | 4.95E+07 |
| 3.07 | 59.55 | 5.26E+07 |
| 3.3 | 64.19 | 5.53E+07 |
| 3.53 | 68.83 | 5.81E+07 |
| 3.77 | 73.7 | 6.10E+07 |
| 4 | 78.41 | 6.38E+07 |
| 4.24 | 83.19 | 6.66E+07 |
| 4.47 | 87.91 | 6.94E+07 |
| 4.7 | 92.59 | 7.21E+07 |
| 4.94 | 97.38 | 7.50E+07 |
| 5.03 | 99.09 | 7.78E+07 |
| 5.05 | 99.27 | 6.22E+07 |
| 5.09 | 99.79 | 6.22E+07 |
| 5.1 | 100 | 6.22E+07 |

Example 15

The following table represents a computer generated modeling of injection molded flow characteristics exactly as in Example 14, but wherein a third and fourth gate are used. The gates are positioned such that two sets of gates oppose each other along each of the opposing long edges. Gates 1 and 2 are thus located at 416 mm and 833 mm along the first 1250 mm edge, while gates 3 and 4 are located at 416 mm and 833 mm of the second 1250 mm edge.

| Time (Seconds) | Volume Percent | Pressure (Pascals) |
|---|---|---|
| 0.24 | 2.67 | 1.07E+07 |
| 0.47 | 7.1 | 1.51E+07 |
| 0.71 | 11.83 | 1.77E+07 |
| 0.94 | 16.65 | 1.97E+07 |
| 1.19 | 21.63 | 2.12E+07 |
| 1.43 | 26.7 | 2.24E+07 |
| 1.66 | 31.52 | 2.34E+07 |
| 1.9 | 36.54 | 2.44E+07 |
| 2.13 | 41.26 | 2.52E+07 |
| 2.36 | 46.13 | 2.60E+07 |
| 2.61 | 51.27 | 2.67E+07 |
| 2.83 | 56.05 | 2.73E+07 |
| 3.06 | 60.84 | 2.79E+07 |
| 3.31 | 66.08 | 2.86E+07 |
| 3.55 | 70.98 | 2.97E+07 |
| 3.78 | 75.69 | 3.10E+07 |
| 4.02 | 80.68 | 3.23E+07 |
| 4.24 | 85.38 | 3.35E+07 |
| 4.47 | 90.04 | 3.50E+07 |
| 4.71 | 94.94 | 3.84E+07 |
| 4.94 | 99.13 | 4.35E+07 |
| 4.95 | 99.32 | 3.48E+07 |
| 4.98 | 99.65 | 3.48E+07 |
| 4.98 | 100 | 3.48E+07 |

Example 16

The following table represents a computer generated modeling of injection molded flow characteristics exactly as in Example 15, but wherein a fifth and sixth gate are used. The gates are positioned such that two sets of gates oppose each other along each of the opposing long edges. Gates 1, 2 and 3 are thus located at 312.5 mm, 625 mm, and 973.5 mm along the first 1250 mm edge, while gates 4, 5 and 6 are located at 312.5 mm, 625 mm, and 973.5 mm of the second 1250 mm edge.

| Time (Seconds) | Volume Percent | Pressure (Pascals) |
|---|---|---|
| 0.24 | 3.65 | 8.80E+06 |
| 0.47 | 8.22 | 1.16E+07 |
| 0.72 | 13.29 | 1.33E+07 |
| 0.95 | 18.15 | 1.46E+07 |
| 1.2 | 23.2 | 1.56E+07 |
| 1.41 | 27.71 | 1.63E+07 |
| 1.65 | 32.65 | 1.71E+07 |
| 1.91 | 38.14 | 1.78E+07 |
| 2.15 | 43.08 | 1.83E+07 |
| 2.36 | 47.59 | 1.93E+07 |
| 2.6 | 52.6 | 2.06E+07 |
| 2.82 | 57.17 | 2.18E+07 |
| 3.07 | 62.23 | 2.30E+07 |
| 3.29 | 66.9 | 2.42E+07 |
| 3.53 | 71.8 | 2.54E+07 |
| 3.78 | 76.97 | 2.67E+07 |
| 4.01 | 81.66 | 2.77E+07 |
| 4.24 | 86.4 | 2.90E+07 |
| 4.47 | 91.25 | 3.02E+07 |
| 4.72 | 96.49 | 3.15E+07 |
| 4.85 | 99.07 | 3.26E+07 |
| 4.86 | 100 | 2.60E+07 |

Example 17

Figure 9:
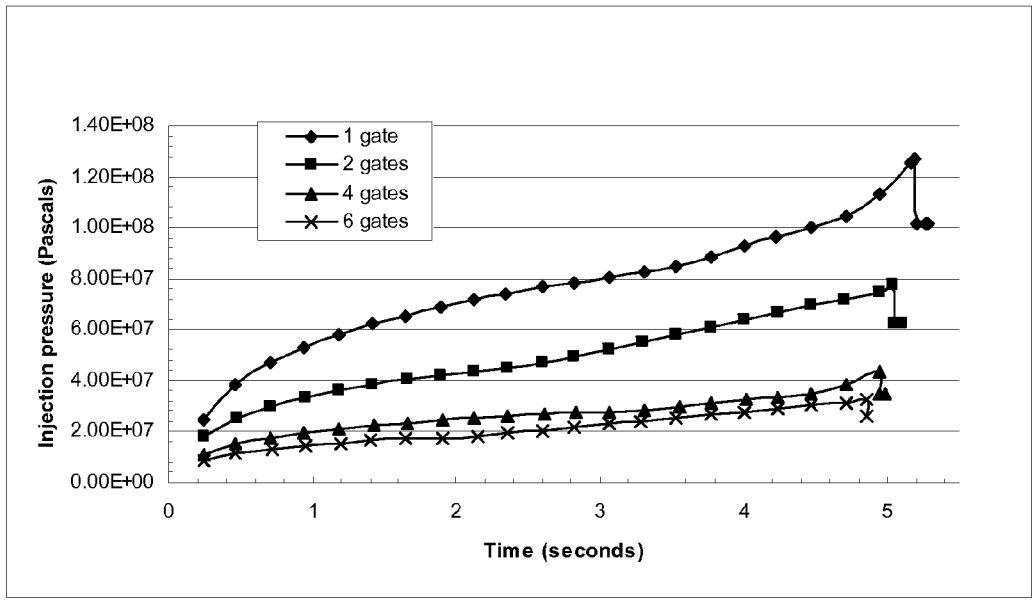
FIG. 9 represents increase in injection pressure over time for an injection molded glazing with four different gate configurations.

A graph of injection pressure over time for the data given above in Examples 13 through 16 is shown in FIG. 9.

Example 18

Figure 10:
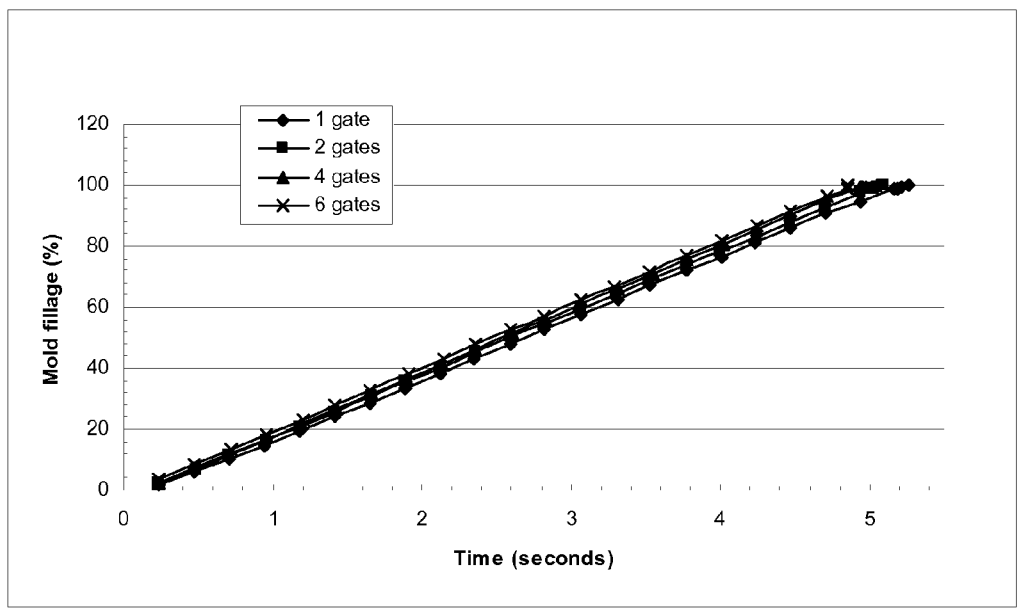
FIG. 10 represents mold volume filled over time for an injection molded glazing with four different gate configurations.

A graph of mold fillage percentage over time for the data given above in Examples 13 through 16 is shown in FIG. 10.

Example 19

The following table represents a computer generated modeling of injection molded flow characteristics for injection in between glass plates heated to temperatures of 50° C. and has a gap of 1.8 millimeters. A plasticized poly(vinyl butyral) having a molecular weight range of 40,000 to 100,000 is heated to a melt temperature of 220° C. prior to injection. The dimensions of the cavity between the glass plates is 1250 millimeters wide by 750 millimeters long. The melt is fed through a single gate centered at the edge of the 1250 millimeter side. For the purposes of the simulation, injection time is assumed to be approximately 5 seconds, and the maximum injection pressure supplied by the equipment is limited to 1.72×108 Pascals (25,000 pounds per square inch).

| Time (Seconds) | Volume Percent | Pressure (Pascals) |
|---|---|---|
| 0.24 | 2.93 | 1.23E+07 |
| 0.48 | 7.27 | 1.86E+07 |
| 0.73 | 11.81 | 2.39E+07 |
| 0.97 | 16.33 | 2.86E+07 |
| 1.2 | 20.75 | 3.29E+07 |
| 1.45 | 25.39 | 3.73E+07 |
| 1.69 | 30.05 | 4.16E+07 |
| 1.93 | 34.63 | 4.58E+07 |
| 2.17 | 39.19 | 4.98E+07 |
| 2.41 | 43.83 | 5.39E+07 |
| 2.65 | 48.44 | 5.79E+07 |
| 2.88 | 52.93 | 6.18E+07 |
| 3.12 | 57.56 | 6.57E+07 |
| 3.37 | 62.34 | 6.98E+07 |
| 3.61 | 66.89 | 7.40E+07 |
| 3.85 | 71.53 | 8.01E+07 |
| 4.09 | 76.04 | 8.62E+07 |
| 4.33 | 80.41 | 9.20E+07 |
| 4.57 | 84.99 | 9.78E+07 |
| 4.8 | 89.35 | 1.04E+08 |
| 5.05 | 93.71 | 1.14E+08 |
| 5.28 | 97.71 | 1.28E+08 |
| 5.37 | 99 | 1.34E+08 |
| 5.38 | 99.16 | 1.07E+08 |
| 5.45 | 99.97 | 1.07E+08 |
| 5.46 | 100 | 1.07E+08 |

Example 20

The following table represents a computer generated modeling of injection molded flow characteristics exactly as in Example 19, but wherein the cavity has a 2 millimeter width:

| Time (Seconds) | Volume Percent | Pressure (Pascals) |
|---|---|---|
| 0.24 | 3.91 | 6.47E+06 |
| 0.48 | 8.67 | 8.80E+06 |
| 0.73 | 13.49 | 1.06E+07 |
| 0.96 | 18.14 | 1.21E+07 |
| 1.21 | 23.02 | 1.36E+07 |
| 1.44 | 27.72 | 1.49E+07 |
| 1.68 | 32.54 | 1.63E+07 |
| 1.92 | 37.31 | 1.76E+07 |
| 2.16 | 42.1 | 1.88E+07 |
| 2.41 | 46.96 | 2.01E+07 |
| 2.65 | 51.77 | 2.14E+07 |
| 2.88 | 56.38 | 2.26E+07 |
| 3.14 | 61.44 | 2.39E+07 |
| 3.36 | 65.96 | 2.51E+07 |
| 3.61 | 70.86 | 2.69E+07 |
| 3.84 | 75.42 | 2.88E+07 |
| 4.09 | 80.3 | 3.09E+07 |
| 4.32 | 84.78 | 3.29E+07 |
| 4.57 | 89.59 | 3.50E+07 |
| 4.8 | 94.01 | 3.84E+07 |
| 5.05 | 98.54 | 4.37E+07 |
| 5.07 | 99.02 | 4.45E+07 |
| 5.09 | 99.23 | 3.56E+07 |
| 5.15 | 99.98 | 3.56E+07 |
| 5.15 | 100 | 3.56E+07 |

Example 21

The following table represents a computer generated modeling of injection molded flow characteristics exactly as in Example 19, but wherein the glass plates are heated to 200° C.:

| Time (Seconds) | Volume Percent | Pressure (Pascals) |
|---|---|---|
| 0.24 | 3.19 | 9.69E+06 |
| 0.49 | 7.93 | 1.27E+07 |
| 0.72 | 12.7 | 1.44E+07 |
| 0.96 | 17.53 | 1.56E+07 |

-continued

| Time (Seconds) | Volume Percent | Pressure (Pascals) |
|---|---|---|
| 1.2 | 22.4 | 1.66E+07 |
| 1.44 | 27.38 | 1.75E+07 |
| 1.68 | 32.23 | 1.82E+07 |
| 1.93 | 37.35 | 1.88E+07 |
| 2.16 | 42.15 | 1.94E+07 |
| 2.41 | 47.17 | 1.99E+07 |
| 2.65 | 52.14 | 2.04E+07 |
| 2.89 | 57.17 | 2.08E+07 |
| 3.13 | 62.01 | 2.12E+07 |
| 3.37 | 66.98 | 2.17E+07 |
| 3.6 | 71.71 | 2.26E+07 |
| 3.84 | 76.57 | 2.35E+07 |
| 4.08 | 81.53 | 2.44E+07 |
| 4.33 | 86.44 | 2.53E+07 |
| 4.56 | 91.21 | 2.66E+07 |
| 4.8 | 95.87 | 2.92E+07 |
| 4.97 | 99.02 | 3.25E+07 |
| 4.98 | 99.2 | 2.60E+07 |
| 5.04 | 99.98 | 2.60E+07 |
| 5.05 | 100 | 2.60E+07 |

Example 22

The following table represents a computer generated modeling of injection molded flow characteristics exactly as in Example 19, but wherein the glass plates are heated to 200° C. and the cavity has a 2.8 millimeter gap:

| Time (Seconds) | Volume Percent | Pressure (Pascals) |
|---|---|---|
| 0.24 | 4.09 | 5.32E+06 |
| 0.48 | 8.92 | 6.49E+06 |
| 0.72 | 13.85 | 7.19E+06 |
| 0.97 | 18.86 | 7.71E+06 |
| 1.21 | 23.92 | 8.12E+06 |
| 1.44 | 28.73 | 8.45E+06 |
| 1.69 | 33.77 | 8.75E+06 |
| 1.92 | 38.62 | 9.00E+06 |
| 2.16 | 43.62 | 9.24E+06 |
| 2.41 | 48.65 | 9.45E+06 |
| 2.64 | 53.54 | 9.64E+06 |
| 2.89 | 58.69 | 9.83E+06 |
| 3.13 | 63.64 | 1.00E+07 |
| 3.36 | 68.42 | 1.03E+07 |
| 3.61 | 73.55 | 1.07E+07 |
| 3.85 | 78.35 | 1.10E+07 |
| 4.08 | 83.22 | 1.14E+07 |
| 4.32 | 88.12 | 1.18E+07 |
| 4.56 | 93.01 | 1.26E+07 |
| 4.8 | 97.87 | 1.42E+07 |
| 4.86 | 99.04 | 1.50E+07 |
| 4.87 | 99.23 | 1.20E+07 |
| 4.93 | 99.97 | 1.20E+07 |
| 4.93 | 100 | 1.20E+07 |

Example 23

Figure 11:
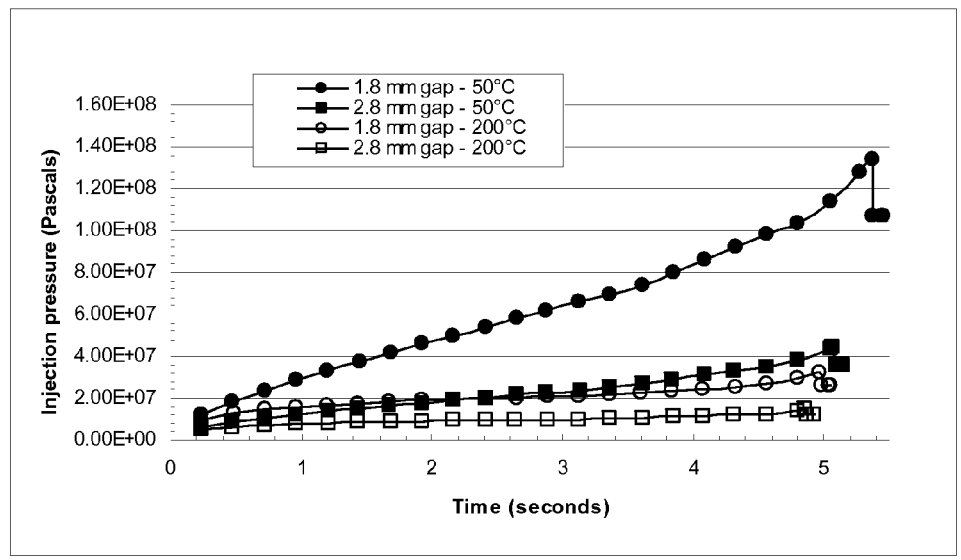
FIG. 11 represents increase in injection pressure over time for an injection molded glazing with four different gap and temperature configurations.

A graph of injection pressure over time for the data given above in Examples 19 through 22 is shown in FIG. 11.

Example 24

Figure 12:
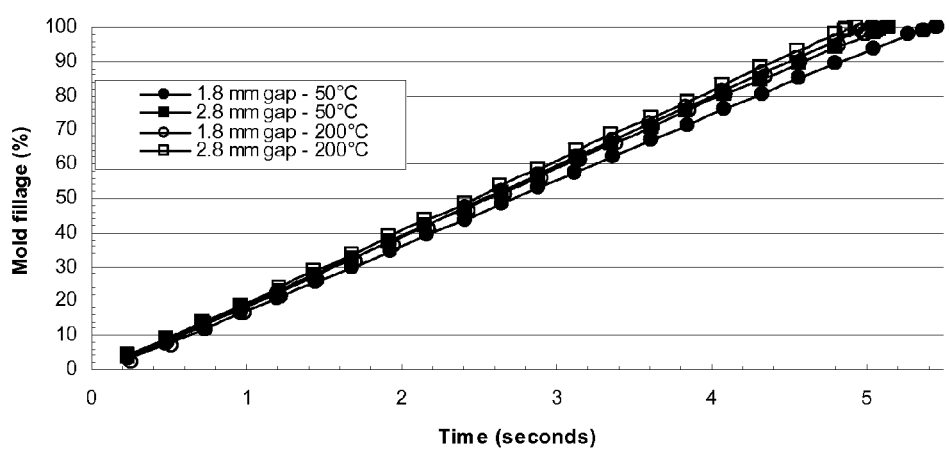
FIG. 12 represents mold volume filled over time for an injection molded glazing with four different gap and temperature configurations.

A graph of mold fillage percentage over time for the data given above in Examples 19 through 22 is shown in FIG. 12.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

It will further be understood that any of the ranges, values, or characteristics given for any single component of the present invention can be used interchangeably with any ranges, values, or characteristics given for any of the other components of the invention, where compatible, to form an embodiment having defined values for each of the components, as given herein throughout. For example, a polymer resin can be formed comprising residual hydroxyl content in any of the ranges given in addition to any of the ranges given for plasticizer, where appropriate, to form many permutations that are within the scope of the present invention but that would be cumbersome to list.

Any figure reference numbers given within the abstract or any claims are for illustrative purposes only and should not be construed to limit the claimed invention to any one particular embodiment shown in any figure.

Figures are not drawn to scale unless otherwise indicated.

Each reference, including journal articles, patents, applications, and books, referred to herein is hereby incorporated by reference in its entirety.

We claim:

1. A method of making a multiple layer glazing panel, the method comprising:
   providing two rigid glazing substrates;
   positioning said glazing substrates in a position relative to each other, thereby forming a space devoid of any material between the entire interior surface areas of said glazing substrates; and,
   injecting a polymer melt into said space between said glazing substrates until the entirety of said space is filled with said polymer melt to create a polymer interlayer, thereby forming said multiple layer glazing panel;
   wherein said polymer melt comprises poly(vinyl butyral) having a molecular weight of less than 70,000 Daltons;
   wherein one or both of said rigid glazing substrates are heated to at least 80° C. prior to said injecting; and
   wherein said polymer melt is injected into said space between said glazing substrates through at least at least one point of injection located at or within the perimeter of said space between said glazing substrates.

2. The method of claim 1, wherein one or both of said rigid glazing substrates are heated to at least 150° C. prior to said injecting, and wherein at least four points of injection are used.

3. The method of claim 1, wherein said substrates are glass.

4. A method of making a multiple layer glazing panel, the method comprising:
   providing two rigid glazing substrates;
   positioning said two rigid glazing substrates in a position relative to each other inside an injection molding mold, thereby forming a space devoid of any material between the entire interior surface areas of said glazing substrates, wherein the width of said space between the entire interior surface areas of said glazing substrates corresponds to the desired thickness of a polymer layer in said multiple layer glazing panel;
   injecting a polymer melt into said space between said glazing substrates until the entirety of said space is filled with said polymer melt to create said polymer interlayer, thereby forming said multiple layer glazing panel;

wherein said polymer melt comprises poly(vinyl butyral) having a molecular weight of less than 70,000 Daltons;

wherein one or both of said rigid glazing substrates are heated to at least 80° C. prior to said injecting; and wherein said polymer melt is injected into said space between said glazing substrates through at least one point of injection located at or within the perimeter of said space between said glazing substrates.

5. The method of claim 4, wherein a vacuum is used to secure each of said glass substrates against a respective half of the injection molding mold in said position relative to each other.

6. The method of claim 1, at least one point of injection includes at least two separate points of injection that are located on opposite sides of said glazing substrates.

7. The method of claim 1, wherein said polymer melt is injected into said space between said glazing substrates through at least four separate points of injection located at or within the perimeter of said space between said glazing substrates.

8. The method of claim 1, further comprising, prior to said injecting, melting a solidified polymer material to form said polymer melt.

9. The method of claim 1, wherein said injecting comprises feeding said polymer melt into a nozzle, runner, and gating system that directs said melt, under pressure, into said space between said glazing substrates.

\* \* \* \* \*